US008589497B2

(12) United States Patent
Balasubramanian et al.

(10) Patent No.: US 8,589,497 B2
(45) Date of Patent: Nov. 19, 2013

(54) APPLYING TAGS FROM COMMUNICATION FILES TO USERS

(75) Inventors: Swaminathan Balasubramanian, Southfield, MI (US); Bruce D. D'Amora, Hawthorne, NY (US); John Handy-Bosma, Austin, TX (US); Andrew R. Jones, Austin, TX (US); Neal M. Keller, Yorktown Heights, NY (US); Brian M. O'Connell, Research Triangle Park, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1015 days.

(21) Appl. No.: 12/633,467

(22) Filed: Dec. 8, 2009

(65) Prior Publication Data

US 2011/0138000 A1 Jun. 9, 2011

(51) Int. Cl.
*G06F 15/16* (2006.01)
(52) U.S. Cl.
USPC .................. 709/206; 709/220; 707/3; 726/23
(58) Field of Classification Search
USPC ........................... 709/206, 220; 707/3; 726/23
See application file for complete search history.

(56) References Cited

U.S. PATENT DOCUMENTS

| | | | |
|---|---|---|---|
| 6,421,675 B1 | 7/2002 | Ryan et al. | |
| 6,788,929 B2 | 9/2004 | Hymel | |
| 7,277,911 B2 | 10/2007 | Cheah | |
| 7,310,416 B1 | 12/2007 | Henderson | |
| 7,558,830 B2 | 7/2009 | Cama | |
| 7,958,557 B2 * | 6/2011 | Kwan | 726/23 |
| 2004/0186848 A1 | 9/2004 | Kobashikawa et al. | |
| 2004/0199587 A1 | 10/2004 | McKnight | |
| 2006/0041597 A1 | 2/2006 | Conrad et al. | |
| 2006/0293904 A1 | 12/2006 | Ramanathan et al. | |
| 2007/0073688 A1 | 3/2007 | Fry | |
| 2007/0106728 A1 | 5/2007 | Adams et al. | |
| 2007/0143298 A1 | 6/2007 | Surendran et al. | |
| 2007/0174247 A1 | 7/2007 | Xu et al. | |
| 2008/0001717 A1 | 1/2008 | Fiatal | |
| 2008/0086458 A1 * | 4/2008 | Robinson et al. | 707/3 |
| 2008/0086496 A1 | 4/2008 | Kumar et al. | |

OTHER PUBLICATIONS

International Business Machines Corporation, Method for Sender Specified E-Mail Tagging and Sender/Client Tag Remediation, Aug. 26, 2009, IPCOM000186552D, IP.com Graham, R.; Plurality: A Context-Aware Personalized Tagging System; Date: Apr. 2008; Item: Paper; WWW 2008; Location: Beijing China.

(Continued)

*Primary Examiner* — Tammy Nguyen
(74) *Attorney, Agent, or Firm* — Arthur Samodovitz; Robert C. Rolnik (57) ABSTRACT

A method, data processing system, and computer program product for associating tags with a person or user. A computer receives a communication file. The computer determines a tag for the communication file to form a communication file association of the tag with the communication file. The computer identifies contact information for a user from the communication file. The computer forms a user association between the user and the tag.

24 Claims, 5 Drawing Sheets

(56) References Cited

OTHER PUBLICATIONS

Kim, H.J.; Spam-mail Filtering System using weighted Bayesian classifier; Date: Aug. 2004; Item: Journal of KISS: Software and Applications; Issue: vol. 31, No, 8; Korea Information Science Society; Location: KR.

Rendle, S.; Learning Optimal Ranking with Tensor Factorization for Tag Recommendation; Date: Jun. 2009; KDD 2009; Location: Paris, FR.

IBM; Enforcing E-mail Subject Line Tag Conventions in E-mail Clients; Date: Aug. 8, 2008; Item: Article No. IPCOM000173480D; IP.com.

IBM; A System and Method for Ensuring that Important Electronic Messages are Read and Sufficiently Processed—Leveraging Trust Relationships in Social Networks; Date: Jan. 21, 2009; Item: Article No. IPCOM000178265D; IP.com.

* cited by examiner

Form Title vote

DRAFT TAGS:                DEADLINE: 00:31
WEPSHERE SERVLET EAR — 201

[WEBSPHERE]    [EAR]    [COMMIT] — 209
DISAGREE AGREE    DISAGREE AGREE

[SERVLET]    [COWBELL] — 221
DISAGREE AGREE    DISAGREE AGREE SUGGEST ADDITIONAL TAG: [   ] — 225

To: john@myserver.com
From: jill@myserver.com
Subject: Report Due
Tag:
The report is due the first day
of each month. Use the
executive template from the
file server. Ask Jane to review.

APPLYING TAGS FROM COMMUNICATION FILES TO USERS

BACKGROUND OF THE INVENTION

1. Field of the Invention

The present invention relates generally to a computer implemented method, data processing system, and computer program product for distributing tags through communication files. More specifically, the present invention relates to use of tags to define the scope of communication files directed to users.

2. Description of the Related Art

Modern uses of networked computers provide tools to author and distribute communication files. A communication file is a file created in a manner suitable for access from a server originating with an author or writer, and targeted for reading or consumption by a recipient or subscriber. A communication file may be, for example, an email, a web page or any other file readily suitable for rendering with commonly available clients such as email clients and web browsers. In particular, web pages, often created for mass consumption, are posted or modified on the Internet by the millions each day. Similarly, in a large corporation or other organization, thousands of emails are circulated, some intended for general availability within the company. Accordingly, a user can have near-limitless access to networks that provide access to communication files, many of which may have little or no relevance to the user's daily activities. In this context, relevance is determined based on the tastes of the user.

A way to sort email and web pages, among other communication files, would be helpful for a user to avoid wasting time reading material of little interest to the user.

SUMMARY OF THE INVENTION

The present invention provides a computer implemented method and data processing system for associating tags with a person or user. A computer receives a communication file. The computer determines a tag for the communication file to form a communication file association of the tag with the communication file. The computer identifies contact information for a person from the communication file. The computer forms a user association between the person and the tag.

In addition, a computer may assign at least one draft tag to the communication file, wherein the at least one draft tag is provided by a first user. The computer solicits at least one additional user to negotiate a tag set for the communication file, wherein the additional user is the person, responsive to identifying contact information for a user. The computer concludes negotiations among the first user and the at least one additional user to form at least one of a tag set selected from the group consisting of an agreed tag set, or a disputed tag set.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
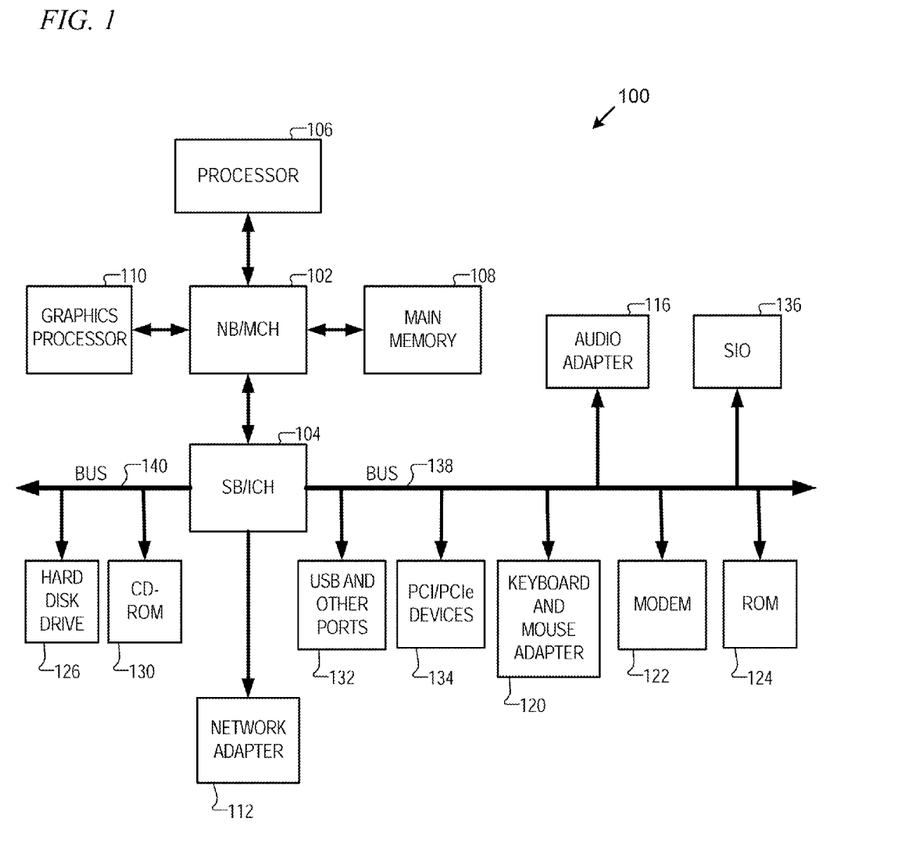
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage device(s) may be utilized. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical-fiber a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The term "computer-readable storage device" does not encompass a signal propagation media such as a copper cable, optical fiber or wireless transmission media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for assigning tags to communication files, and distributing the communication files among users. The illustrative embodiments may use the communication files to associate a person with one or more tags. A tag is a string or other word comprised at least of alpha-numeric characters that identifies a topic, subject area, condition or other attribute of a communication file. The tag can be used to associate a person with topics that interest the person, or as an attribute to identify the person, such as "tall", "dark", and "bearded". A person is a human being, which can be referred to within a communication file. A user is a person who relies on a computer to perform data processing functions. Some people may be users, while others may not be users. Illustrative embodiments can provide ways for users to understand attributes and interests of a person, among other things.

Figure 2:
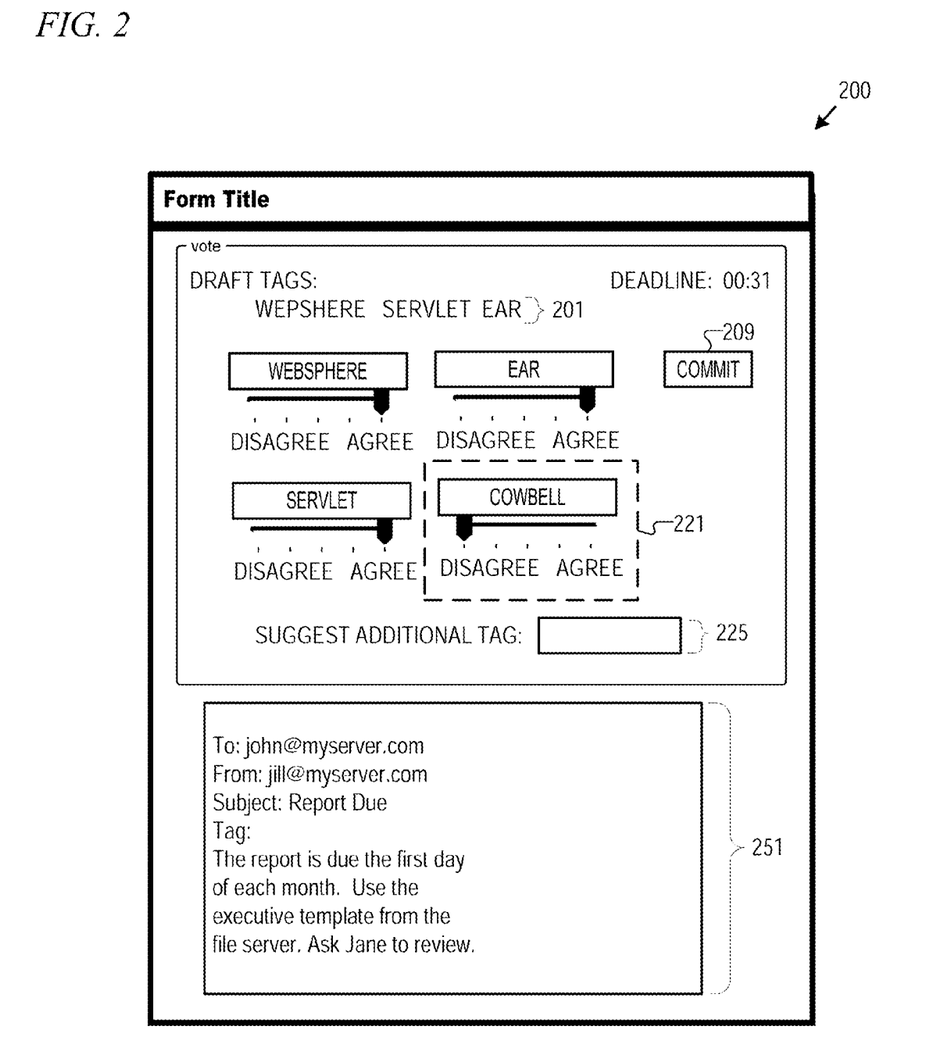
FIG. 2 is a user interface for associating tags to communication files such as emails in accordance with an illustrative embodiment of the invention.

FIG. 2 is a user interface for associating tags to communication files such as emails in accordance with an illustrative embodiment of the invention. Emails, once distributed, may be presented to users who are solicited for their input. Presentation may occur at the time of sending or later, such as when a solicited user reads the distributed email. A user may enter input by indicating a level of agreement that a user has with respect to a particular tag being assigned to a particular email. In addition, a user may suggest additional tags to be voted on concerning the suitability of the additional tag to be assigned the email.

Accordingly, an author to an email may use a client to transmit the email to a server. The server, in response, can direct the email and a solicitation to some or all of the email recipients. The solicitation may be rendered to the display of each solicited recipient as solicitation window 200. Once the solicited recipients receive the solicitation, the recipients and the author form a group called voters.

Solicitation window 200 may dynamically show draft tags 201 in a manner that communicates to each voter the current status of the words, as well as a deadline that may count down a duration before the voting closes. A draft tag is a tag assigned to a communication file such as an email and is offered to recipients as a tag to negotiate agreement. A draft tag set is the tag set that includes all tags entered by the author of the email, if any, and all tags suggested by the recipients solicited for votes. An additional draft tag may be the tags added by a second or additional user. Similarly, the additional draft tag may be a tag added by the email's author after the author sends the email. Similarly, the additional draft tag may be a tag suggested by a program after parsing the previous tags and the sent email and comparing to a repository of co-occurring tags. Furthermore, the solicitation window shows an email 251 in a manner to allow voters to judge the content of the email and trigger the human intuition that is associated with selecting tags. At the conclusion of a voter's interest in the solicitation, the voter may select or click on commit button 209 to register that their vote is finalized.

Accordingly, the solicitation window may be rendered by a client. The client is a computer that executes instructions according to a data processing system, e.g., data processing system 100 of FIG. 1. The solicitation window provides at least two ways for a user to influence the tags being voted upon. First, the solicitation window provides a voting control for each draft tag. Second, the solicitation window provides a field or other input means for the user to suggest an additional tag for voting.

A voting control can be, for example, disagree/agree voting control 221. Each voting control permits a user to enter, for example, by using points and clicks, a vote corresponding to the tag with respect to the email. The voting control may have labels that are rendered to the screen that permit the control, in this case, a slider feature, to be adjusted according to the tastes of the voter. The voting control may allow a user to enter gradations of agreement, in this case, five agreement levels are provided for each voting control. Accordingly, a selectable level of agreement is one of at least two choices that measure a degree to which the user is agreed with the association of a tag with an email or other communication file. Each vote can be tentative until a user signals that he will commit the votes, or until voting closes. The user may signal commitment by clicking a button, for example, commit button 209. A user-selectable button to submit tags for negotiation is a button that allows a user to signal, via a user interface, a desire to submit tags, and optionally conclude negotiations.

Additional tag field 225 may be used by the client to receive suggestions from a voter for inclusion as a tag associated with the email. The field allows text entry of the user and the voter to communicate the tag, via a client, to a server. The server, in turn, may transmit the new term within a re-rendered solicitation transmitted to all voters. Each client may render the solicitation windows to add an additional voting control for the new draft tag. The server may set an initial vote for a voter to be an arbitrary level or a preset level. Alternatively, each client may set the initial vote in a manner prescribed by the user of each client.

The client may re-arrange the order of draft tags 201 to respond to adjustments in voting controls made through each client. Such changes in the order may respond to signals from the clients that update the votes. The server can direct the changes by transmitting refreshed solicitation content to each client. A description of the ordering is described further below.

Figure 3:
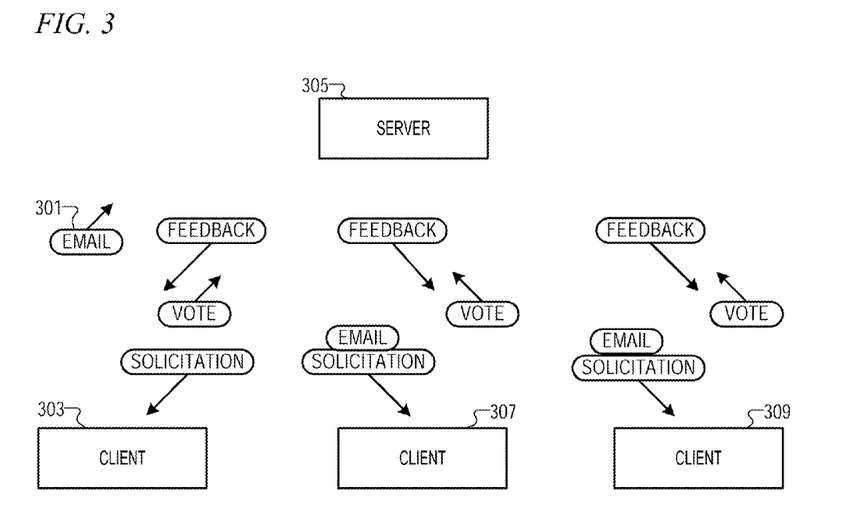
FIG. 3 is a block diagram of the logical relationship of the clients, the server and messages in accordance with an illustrative embodiment of the invention.

FIG. 3 is a block diagram of the logical relationship of the clients, the server and messages in accordance with an illustrative embodiment of the invention. Initially, an email author may dispatch email 301 that solicits votes to the server 305. The author may rely upon client 303 to send the solicitation, updated votes, as well as receive feedback.

The email author may have two peers who rely upon client 307 and client 309 to receive and process solicitations and votes. Accordingly, server 305 may send the email with a solicitation to each user. Each client, under control of their respective user or voter, dispatches vote to server 305. At the conclusion of a deadline, or when all voters have committed their votes, or when a pre-specified number of voters have committed their votes, server 305 may determine a tag set that is either an agreed tag set, or a disputed tag set. An agreed tag set is a tag set on which all voters agree, or a set of tags where each tag has accrued votes that are within a reasonable tolerance, each vote to the other, as to a level of agreement. A disputed tag set is a set of tags where at least one tag has divergent votes where the votes either do not count the same, or the votes are outside the reasonable tolerance as to level of agreement. An agreement level is a setting for a tag assigned to a specific user to indicate a level to which the user manifests agreement for assigning the tag to a communication file such as an email. The user may manifest agreement by actively changing or setting an agreement level through a user interface, or by passively accepting a proposed agreement level.

The votes that the server collects, either by active user inputs, or passive user defaults, may be such that the votes for a tag do not diverge. A vote of the first user and the vote of the second or additional user do not diverge when both votes are neutral or at least mildly agree. A vote of the first user and the vote of the additional user do not diverge when both votes are neutral or at most mildly disagree.

Figure 4:
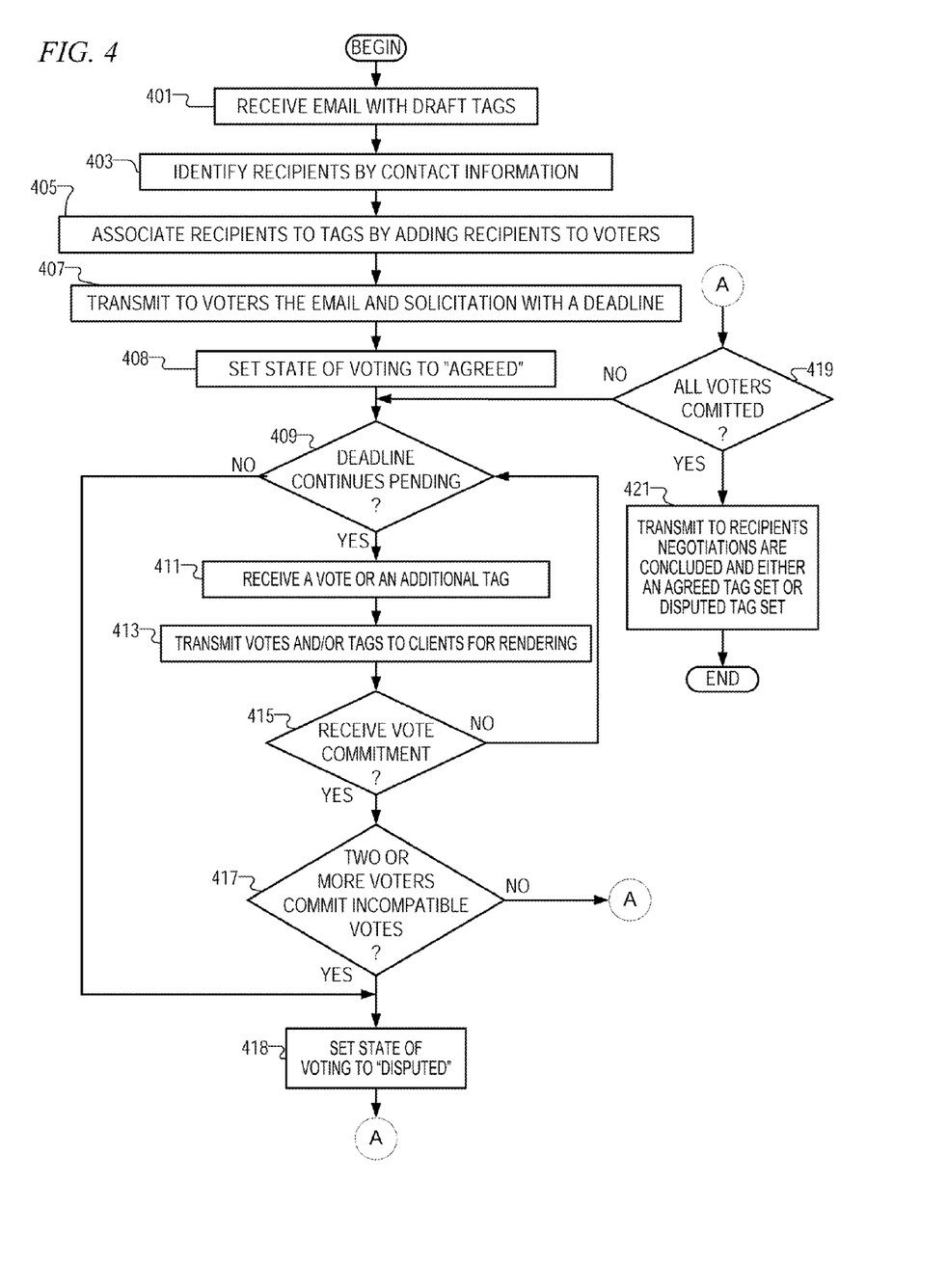
FIG. 4 is a flowchart that a server may perform to mediate negotiation of a tag set for an email in accordance with an illustrative embodiment of the invention.

FIG. 4 is a flowchart that a server may perform to mediate negotiation of a tag set for an email in accordance with an illustrative embodiment of the invention. Initially, the server may receive an email with draft tags (step 401). The server may be, for example, server 301 of FIG. 3 implemented by data processing system 100 of FIG. 1. Next, the server may identify recipients by contact information (step 403). The contact information can be emails placed in a to-attribute of the email. Next, the server may associate recipients to tags by adding recipients to voters (step 405). A setting to the server can be that all recipients are to be solicited for votes. However, an administrator to the server can associate attributes with users or each user's email that states a policy with respect to that user. Accordingly, the server may select only those recipients that satisfy the policy previously set. For example, employees of a company with specified attributes may be determined, accordingly, to be solicited as voters. In contrast, employees without the specified attributes may not be solicited for inputs related to tags. For another example, half of the employees of a company may be solicited as voters only during the first half of the year while the other half of the employees may be solicited as voters only during the second half of the year.

Next, the server may transmit to voters the email and solicitation with a deadline (step 407). The server may transmit the solicitation by embedding attributes of the solicitation as commands in the email, such as in hidden header fields, to be processed by the voters' email clients. Alternatively, the server may transmit the solicitation separate from the email to be processed by a dedicated voter solicitation client. Alternatively, an email client may query a solicitation service for the existence and, if applicable, attributes of a solicitation pertinent to the user. The email client or dedicated voter solicitation client may present the user with a batch of pending solicitations in a single interface rendered upon user request, at a specified time, or upon an event trigger. Alternatively, the user may be presented with any pending solicitations in a sequential queue interface rendered upon user request, at a specified time, or upon an event trigger, including the moment an email and solicitation is received. Alternatively, the user may be presented with a pending solicitation for an email being opened or previewed by the user. The presentation may be in the form of an interface such as solicitation window 200 in FIG. 2, optionally preceded by a message such as, "You have a pending tag to vote on. Click OK to vote or Cancel to not vote.", and optionally displayed in a status bar message or other window location, such as, "You have 5 tags to vote on in 2 emails. Click Tags if you would like to vote."

Next, the server may set the state of voting to "agreed" (step 408). A state of "agreed" can be a default state that is determined if all voters refrain from voting or no changed votes are received at the server. Next, the server may determine if the deadline continues pending (step 409). In other words, a determination is made whether there is time left unexpired before the deadline. If time remains for voting, the server may receive a vote or an additional tag (step 411).

In response to receiving a vote or additional tag, the server may transmit the vote and/or additional tag to each client for rendering (step 413). Next, the server may determine whether it has received a vote commitment (step 415). If a vote commitment has been received, the server may determine whether two or more voters commit incompatible votes (step 417). If two or more voters have committed incompatible votes, the server may set the state of voting to disputed (step 418). However, if step 417 is determined negatively, or after step 418, the server may determine if all voters have committed (step 419). If so, the server may transmit to recipients negotiations are concluded, and transmit an agreed tag set or disputed tag set (step 421). Processing may terminate thereafter.

Negative determinations at steps 415 and 419 may direct the server to resume processing at step 409.

Further processing may propagate for data-mining the agreed tag set or the disputed tag set. Such a tag set can be mined at the request of authorized personnel to produce data regarding term popularity. An additional use can be to accumulate statistics concerning the affinity two terms may have to each other, as judged by voters in the system. Such an affinity can be stored to a word or term co-occurrence database to be used by data processing systems that offer suggestions for additional popularly co-occurring words.

Figure 5:
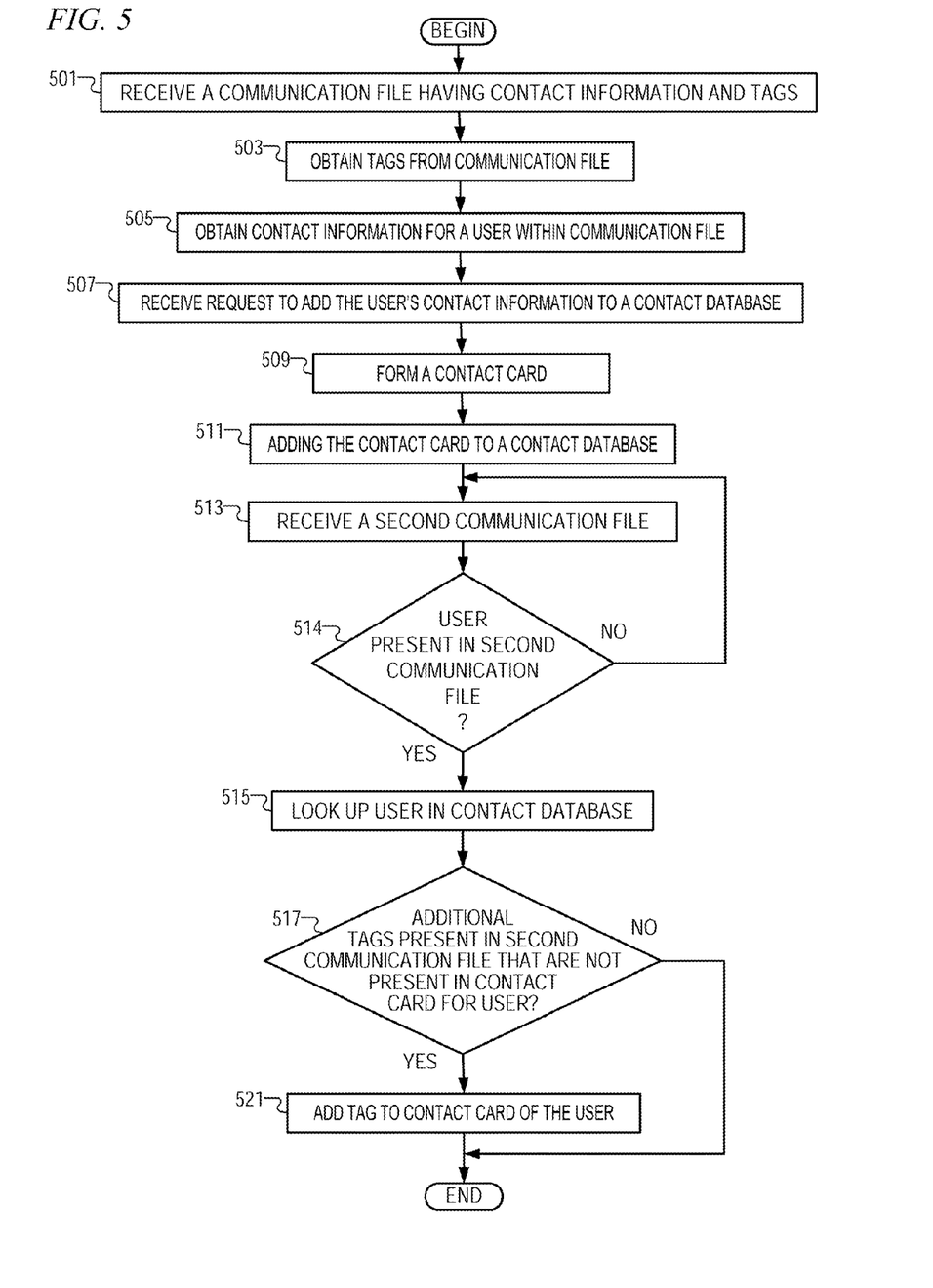
FIG. 5 is a flowchart to determine distribution of an email through the use of tags associated with a user in accordance with an illustrative embodiment of the invention.

FIG. 5 is a flowchart to determine distribution of an email through the use of tags associated with a user in accordance with an illustrative embodiment of the invention. Initially a computer may receive a communication file having contact information and tags (step 501). A communication file is a file created in a manner suitable for access from a server originating with an author or writer, and targeted for reading or consumption by a recipient or subscriber. A communication file may be, for example, an email, a web page, or any other file readily suitable for rendering with commonly available clients such as email clients and web browsers. Next, the computer may obtain tags from the communication file (step 503). The tags may be, for example, metatags, tags in an email, or any other string that summarizes context. In at least one embodiment, the tags are tags for an email.

Next, the computer may obtain contact information for a user within the communication file (step 505). Contact information can include an email address, a user's name, telephone number, and the like. Next, the computer may receive a request to add the user's contact information to a contact database (step 507). A contact database is a repository that stores a name and at least one identifier of an address by which to contact the person or organization associated with a name. The address can be, for example, a telephone number, an Internet address, a street address, among others. In response, the computer may form a contact card (step 509). By forming the contact card, the computer may form an association between the user and the tag by associating an email address to the user. The user request to add the contact information for the user (apparent in the communication file) can be a mouse input to select a button corresponding to the communication file. Alternatively, the user may be offered a menu-operated user interface, whereby the user selects menu functions to indicate a user request to add contact information to a contact database, for example, from a web page. A contact card can be any accepted manner of collecting information regarding how to contact an individual or organization. An example of a contact card is a vCard.

Next, the computer may add the contact card to a contact database (step 511). Next, the computer may receive a second communication file (step 513). The second communication file can be, for example, a web page, among others. Next, the computer may determine if the user or a user identifier corresponding to the user is present in the second communication file (step 514). A presence of the user identifier, for example, the user's name or email address, can form a positive result to step 514. A positive determination may cause the computer to look up the user in the contact database (step 515). If the user is not present in the second communication file, the computer may repeatedly receive second communication files at step 513.

However, if the user is found in the contact database, the computer may add one or more tags of the second communication file to the contact card of the user (step 521). Processing may terminate thereafter.

In some embodiments, step 513 may be modified to query a website that hosts tag associations with users. A website is a data processing system executing computer instructions to respond to Internet requests such has hypertext transfer protocol requests. Accordingly, one method to receive the second communication file is for the computer to make a user-name based query or look-up to a website that hosts records for associating tags to users. Such a website may obtain tags through a community of users. In other words, the website may obtain tags by soliciting tag-to-user associations from the public, for example. By obtaining a tag coupled to a user in this manner, the tag or tags so obtained can be added to the contact card at step 521, and periodically updated to reflect changing tag associations present at the website. Accordingly, a user association can be formed within the contact database, through the operation of locating tags associated with a user's name. The user association can be a combination of at least a tag with an identification of the user as a record. Alternatively, the user association can be an association of a user with a vote of approval or disagreement concerning the matching or associating of a tag to an email.

Among the uses that the contact database may be put, is that the database may be searched based on tag criteria. For example, a Boolean search can apply Boolean logic to a user entered one or more tags entered by users. Accordingly a user can make a request to search based on a tag. Thus, a client computer can receive the request to search based on the tag. Further, the client computer may look-up a user and render an associated contact card to a display. Processing may terminate thereafter.

Figure 6:
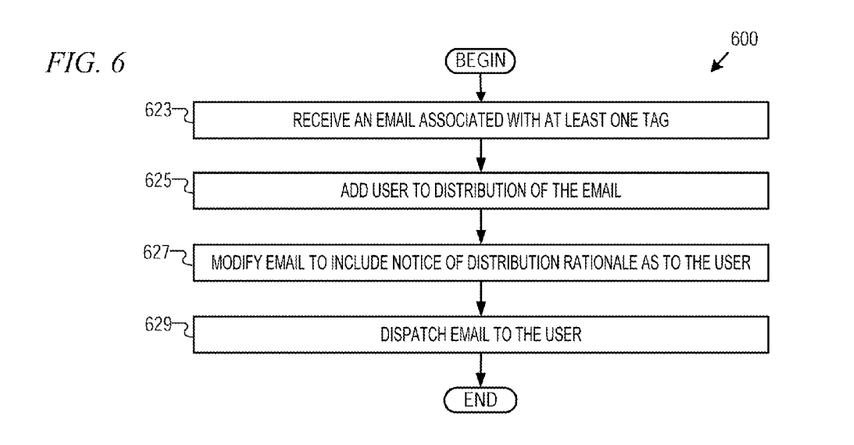
FIG. 6 is a flowchart for determining additional distribution for an email having a tag, in accordance with an illustrative embodiment of the invention.

FIG. 6 is a flowchart for determining additional distribution for an email having a tag, in accordance with an illustrative embodiment of the invention. Thus, subscriber flowchart 600 can be a way to form a user association where the user association of a tag to a user is a criterion for subscribing the user to an electronic communication. Initially, a server may receive an email associated with at least one tag (step 623). By determining that the email is associated with at least one tag, the computer determines that the email satisfies the criteria. The criteria, in this case, is an email having a particular tag or tags. Next, the server may add a user to the distribution of the email (step 625). The server may add the user on the basis of the user email being stored to a contact database that associates the user to the tag. Next, the server may modify the email (at least as directed to the user) to include a notice of distribution rationale as to the user (step 627). The distribution rationale is a message that informs a user the way in which the user has been selected for distribution. An example of such a message may be, "You are receiving this email concerning patents, because your contact information appeared with an email tagged with the term 'patent'".

In response to adding the user to the distribution of the email and/or adding the notice of distribution rationale, the computer may form a tag-sourced email. A tag-sourced email is an email where the author of the email did not deliberately specify the user located within step 625. Rather, additional steps that reference the tags in contact cards referring to the user form the basis for the tag-sourced email's transmittal. Accordingly, a tag-sourced email is an email that a computer directed to the recipient based on an apparent interest of the recipient, as expressed in the user-to-tag association.

A risk may be present that the tag-sourcing method can add email addresses that are redundant to those initially selected by the email author. Consequently, an illustrative embodiment may delete any email addresses that are redundant email addresses. A redundant email address is an email address that is the same, or equivalent to, another email address on a to-attribute or distribution field of an email.

Next, the server may dispatch the email to the user (step 629). Processing may terminate thereafter.

The aspects of the illustrative embodiments provide a computer implemented method, data processing system, and computer program product for assigning tags to communication files, and distributing the communication files among users that are associated with such tags.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable storage device providing program code for use by or in connection with a computer or any instruction execution system. For the purposes of this description, a computer-usable or computer readable storage device can be any tangible apparatus that can store the program for use by or in connection with the instruction execution system, apparatus, or device.

The computer-readable storage device can be an electronic, magnetic, optical, electromagnetic, or semiconductor system (or apparatus or device). Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for associating tags with a person, the method comprising:
   receiving a communication file;
   receiving a specification of a tag for the communication file;
   identifying, by one or more processors, from the communication file contact information for a person associated with the communication file;
   associating the person with the tag based on the contact information in the communication file and the step of determining the tag for the communication file; and
   receiving a request to search, based on the tag, for users associated with the tag and in response, based on the association of the person with the tag, displaying the contact information for the person associated with the tag.

2. The method of claim 1, further comprising receiving a user request to add the contact information to a contact database, wherein forming the association between the person and the tag is responsive to receiving the user request and further comprises associating an email address to the person.

3. The method of claim 1, wherein the user association is a criteria for subscribing the person to an electronic communications having at least one matching tag.

4. The method of claim 3, further comprising:
   receiving an email satisfying the criteria, responsive to a sender entering the tag into the email;
   responsive to receiving the email satisfying the criteria, adding an indication in the email to form a tag-sourced email for a user to which the email is directed that the user is subscribed to the email on the basis of the communication file association; and
   dispatching the tag-sourced email to the user.

5. The method of claim 4, wherein receiving an email further comprises removing a redundant email address from the email.

6. The method of claim 1, wherein determining a tag for the communication file comprises:
   assigning at least one draft tag to the communication file, wherein the at least one draft tag is provided by a first user;
   soliciting at least one additional user to negotiate a tag set for the communication file, wherein the second user is the person, responsive to identifying contact information for the person; and
   concluding negotiations between the first user and the at least one additional user to form at least one of a tag set selected from the group consisting of an agreed tag set, or a disputed tag set.

7. The method of claim 6, wherein soliciting the at least one additional user further comprises:
   presenting draft tags to the second user, each draft tag having at least two selectable agreement levels; and
   receiving a selection of at least one selectable agreement level for each draft tag from the at least one additional user.

8. The method of claim 7, the method further comprising;
   responsive to a determination of an agreed tag set, forming the agreed tag set; and
   presenting the agreed tag set as an agreed tag set to the first user and the at least one additional user, wherein the agreed tag set is determined based on the first user and the at least one additional user placing selectable agreement levels for a subset of an agreed tag set above a threshold for some tags.

9. The method of claim 8, wherein agreed tag set is determined based on the user placing selectable agreement levels for tags other than the subset below the threshold.

10. The method of claim 8, wherein the agreed tag set comprises tags that each correspond to votes of the first user and the at least one additional user, wherein the vote of the first user and the vote of the second user do not diverge.

11. The method of claim 7, further comprising receiving an additional draft tag from a second user to add to the draft tag set.

12. The method of claim 7, further comprising ranking the tags in the draft tag set to show an order to which tags have accrued agreement from users as a whole, wherein the users comprise at least an email author and the second user.

13. A method for associating tags with a person, the method comprising:
   receiving a communication file, wherein the communication file is an email;
   identifying contact information for a person from the communication file;
   determining a tag for the communication file to form a communication file association of the tag with the communication file, wherein determining comprises:
      assigning at least one draft tag to the communication file, wherein the at least one draft tag is provided by a first user;
      soliciting at least one additional user to negotiate a tag set for the communication file, wherein the second user is the person, responsive to identifying contact information for a user; and
      concluding negotiations among the first user and the at least one additional user to form at least one of a tag set selected from the group consisting of an agreed tag set, or a disputed tag set; and
   forming a user association between the person and the tag.

14. A computer program product for associating tags with a person, the computer program product comprising:
   a computer readable storage device having computer readable program code stored thereon, the computer readable program code comprising:
   computer readable program code to receive a communication file;

computer readable program code to receive a specification of a tag for the communication file;
computer readable program code to identify contact information for a person from the communication file contact information for a person associated with the communication file;
computer readable program code associate the person with the tag based on the contact information in the communication file and determining the tag for the communication file; and
computer readable program code to receive, based on the tag, for users associated with the tag and in response, based on the association, displaying the contact information for the person associated with the tag.

15. The computer program product of claim 14, wherein the user association is recorded to a contact card suitable for rendering to a computer output device,
and
computer readable program code to receive a user request to add the contact information to a contact database, wherein forming the association between the person and the tag is responsive to receiving the user request and further comprises associating an email address to the person.

16. The computer program product of claim 14, further comprising:
computer readable program code to receive an email satisfying the criteria, responsive to a sender entering the tag into the email, wherein receiving an email further comprises removing a redundant email address from the email;
computer readable program code to add an indication in the email to form a tag-sourced email for a user to which the email is directed that the user is subscribed to the email on the basis of the communication file association, responsive to receiving the email satisfying the criteria; and
computer readable program code to dispatch the tag-sourced email to the user, wherein the user association is a criteria for subscribing the person to an electronic communications having at least one matching tag.

17. The computer program product of claim 14, wherein computer readable program code to determine a tag for the communication file comprises:
computer readable program code to assign at least one draft tag to the communication file, wherein the at least one draft tag is provided by a first user;
computer readable program code to solicit at least one additional user to negotiate a tag set for the communication file, wherein the second user is the user, responsive to identifying contact information for a user; and
computer readable program code to conclude negotiations among the first user and the at least one additional user to form at least one of a tag set selected from the group consisting of an agreed tag set, or a disputed tag set.

18. The computer program product of claim 17, wherein computer readable program code to solicit the at least one additional user further comprises:
computer readable program code to present draft tags to the additional user each draft tag having at least two selectable agreement levels; and
computer readable program code to receive a selection of at least one selectable agreement level for each draft tag from the at least one additional user, wherein the agreed tag set is determined based on the user placing selectable agreement levels for tags other than the subset below the threshold;
computer readable program code to rendering a user-selectable button to submit tags for negotiation.

19. The computer program product of claim 18, the method further comprising;
computer readable program code to form the agreed tag set, responsive to a determination of an agreed tag set; and
computer readable program code to present the agreed tag set as an agreed tag set to the users, wherein the agreed tag set is determined based on the user and the at least one additional user placing selectable agreement levels for a subset of an agreed tag set above a threshold for some tags.

20. A computer system for associating tags with a person, the system comprising:
a central processing unit;
a computer readable memory;
a computer readable storage device and program instructions stored on the storage device for execution by the processing unit via the memory, the program instructions comprising:
first program instructions to receive a communication file;
second program instructions to receive a specification of a tag for the communication file; and
third program instructions to identify contact information for a person from the communication file identify contact information for a person from the communication file contact information for a person associated with the communication file;
fourth program instructions to associate the person with the tag based on the contact information in the communication file and determining the tag for the communication file;
fifth program instructions to receive, based on the tag, for users associated with the to and in response, based on the association, displaying the contact information for the person associated with the tag; and wherein
the first, second, third, fourth, and fifth program instructions are stored on the computer readable storage device for execution by the central processing unit via the computer readable memory.

21. The computer system of claim 20, wherein the user association is recorded to a contact card suitable for rendering to a computer output device, the computer system further comprising:
sixth program instructions to receive a user request to add the contact information to a contact database, wherein forming the association between the person and the tag is responsive to receiving the user request and further comprises associating an email address to the person; and wherein
the sixth program instructions are stored on the computer readable storage device for execution by the central processing unit via the computer readable memory.

22. The computer system of claim 20, the computer system further comprising:
sixth program instructions to receive an email satisfying the criteria, responsive to a sender entering the tag into the email, wherein receiving an email further comprises removing a redundant email address from the email;
seventh program instructions to add an indication in the email to form a tag-sourced email for a user to which the email is directed that the user is subscribed to the email on the basis of the communication file association, responsive to receiving the email satisfying the criteria; and
eighth program instructions to dispatch the tag-sourced email to the user, wherein the user association is a criteria for subscribing the person to an electronic communications having at least one matching tag; and wherein the sixth, seventh, and eighth program instructions are stored on the computer readable storage device for execution by the central processing unit via the computer readable memory.

23. The computer system of claim 20, wherein the second program instructions to determine a tag for the communication file comprises:

sixth program instructions to assign at least one draft tag to the communication file, wherein the at least one draft tag is provided by a first user;

seventh program instructions to solicit at least one additional user to negotiate a tag set for the communication file, wherein the second user is the user, responsive to identifying contact information for a user; and eighth program instructions to conclude negotiations among the first user and the at least one additional user to form at least one of a tag set selected from the group consisting of an agreed tag set, or a disputed tag set; and wherein the sixth, seventh, and eighth program instructions are stored on the computer readable storage device for execution by the central processing unit via the computer readable memory.

24. The computer system of claim 23, wherein the sixth program instructions to solicit the at least one additional user further comprises:

ninth program instructions to present draft tags to the additional user each draft tag having at least two selectable agreement levels;

tenth program instructions to receive a selection of at least one selectable agreement level for each draft tag from the at least one additional user, wherein the agreed tag set is determined based on the user placing selectable agreement levels for tags other than the subset below the threshold; and eleventh program instructions to render a user-selectable button to submit tags for negotiation; and wherein the ninth, tenth, and eleventh program instructions are stored on the computer readable storage device for execution by the central processing unit via the computer readable memory.

* * * * *